(12) United States Patent
Sverdlova et al.

(10) Patent No.: US 12,234,887 B1
(45) Date of Patent: Feb. 25, 2025

(54) HIGH FATIGUE LIFE DETACHABLE CONNECTOR

(71) Applicant: The Crosby Group LLC, Tulsa, OK (US)

(72) Inventors: Nina Sverdlova, Castrop Rauxel (DE); Till Stukenberg, Bochum (DE)

(73) Assignee: The Crosby Group LLC, Tulsa, OK (US)

( * ) Notice: Subject to any disclaimer, the term of this patent is extended or adjusted under 35 U.S.C. 154(b) by 940 days.

(21) Appl. No.: 17/324,954

(22) Filed: May 19, 2021

Related U.S. Application Data (60) Provisional application No. 63/027,384, filed on May 20, 2020.

(51) Int. Cl.
*F16G 15/04* (2006.01)
*F16G 15/12* (2006.01)

(52) U.S. Cl.
CPC .............. *F16G 15/04* (2013.01); *F16G 15/12* (2013.01)

(58) Field of Classification Search
CPC .......... F16G 15/00; F16G 15/02; F16G 15/04; F16G 15/06; F16G 15/10; F16G 15/12; F16G 15/14; Y10T 24/3902
See application file for complete search history.

(56) References Cited

U.S. PATENT DOCUMENTS

| | | | | |
|---|---|---|---|---|
| 2,819,586 A * | 1/1958 | Henry | ...................... | F16G 15/02 59/85 |
| 4,428,187 A * | 1/1984 | Bruce | ...................... | F16G 15/02 59/85 |
| 4,505,103 A * | 3/1985 | Dalferth | ................... | F16G 15/02 59/85 |
| 4,606,188 A * | 8/1986 | Osnes | ...................... | F16G 15/04 59/87 |
| 5,983,620 A * | 11/1999 | Amoss | ..................... | B63B 21/20 59/85 |
| 7,231,759 B2 * | 6/2007 | Benecke | ................. | F16G 13/12 59/84 |
| 8,056,315 B2 * | 11/2011 | Mulle | ..................... | F16G 15/02 59/84 |
| 8,087,227 B2 * | 1/2012 | Feuerstein | .............. | F16G 15/02 59/87 |

(Continued)

FOREIGN PATENT DOCUMENTS

| | | | |
|---|---|---|---|
| DE | 3930842 A1 | * | 12/1990 |
| DE | 3929148 A1 | * | 1/1991 |

(Continued)

*Primary Examiner* — Jonathan P Masinick
(74) *Attorney, Agent, or Firm* — Head, Johnson, Kachigian & Wilkinson, PC (57) ABSTRACT

A high fatigue life detachable connector. The connector includes two J-shaped elements configured to be coupled to each other with a coupling element therebetween. Each of the J-shaped elements has a shorter leg and an opposed longer leg with the legs drawn together by a bow. Each bow has a top cross-section which transitions to a pair of opposed mid cross-sections 45 degrees from the top cross-section, and which thereafter transitions to a pair of opposed joiner cross-sections 90 degrees from the top cross-section, wherein the top cross-section has a substantially flat top exterior and an opposed radiused interior, resulting in optimized material utilization and structural integrity.

7 Claims, 11 Drawing Sheets

(56) References Cited

U.S. PATENT DOCUMENTS

| | | | | |
|---|---|---|---|---|
| 8,756,907 | B2 * | 6/2014 | Briscoe | B21L 15/00 |
| | | | | 59/85 |
| 10,788,101 | B2 * | 9/2020 | Dreixler | F16G 15/12 |
| 2019/0120326 | A1 * | 4/2019 | Stukenberg | F16G 15/02 |
| 2019/0162270 | A1 * | 5/2019 | Stukenberg | F16G 15/04 |

FOREIGN PATENT DOCUMENTS

| | | | |
|---|---|---|---|
| DE | 9010317 U1 * | 1/1992 | |
| DE | 10154901 A1 * | 5/2003 | F16G 13/12 |
| DE | 102010061264 A1 * | 6/2012 | B65G 19/20 |
| DE | 102016108050 A1 * | 11/2017 | F16G 13/14 |
| DE | 102019120286 B3 * | 3/2020 | |
| EP | 0108154 A1 * | 5/1984 | |
| EP | 2048410 A2 * | 4/2009 | B66C 1/34 |

\* cited by examiner

FIG. 12

HIGH FATIGUE LIFE DETACHABLE CONNECTOR

CROSS-REFERENCE

This application is based on and claims priority to U.S. Provisional Patent Application No. 63/027,384, filed May 20, 2020, which is incorporated herein in its entirety by reference.

BACKGROUND OF THE INVENTION

1. Field of the Invention

The present invention is directed to a detachable connector in order to join two end lengths of a chain and/or join a chain and an anchor. In particular, the present invention is directed to a Kenter-style detachable connector with two similar elements that connect together with a coupling element therebetween in order to form a connector.

2. Description of the Related Art

In various applications and usages, a detachable connector is desirable to join two end lengths of a chain together and/or to join an end of a chain and an anchor together, such as a marine anchor. Examples include joining two lengths of chain together to form a longer chain or joining a marine anchor at the end of a chain length.

Kenter-style detachable connectors are known, which utilize two substantially identical or mirror elements that connect together to form a detachable connector. The detachable connector must have a load capacity at least equal to the load capacity of the chain and/or the anchor. In one embodiment, the exterior of the detachable connector must be no larger than the chain links in order to be received in various types of other connectors.

Prior Kenter-style detachable connectors may be seen in U.S. Pat. No. 8,087,227, and in U.S. Pat. Publ. Nos. 2019/0120326 and 2019/0162270.

Notwithstanding the foregoing, there remains a need to provide a detachable connector which will optimize the material utilization and which will increase the fatigue strength of the connector.

It would also be desirable to provide a detachable connector having a crown and bow which transitions from a circular cross-section to a flattened exterior at the top of the crown.

It would also be desirable to provide a detachable connector having a geometric transition of the connector elements in order to achieve greater structural integrity and higher load capacity.

SUMMARY OF THE INVENTION

The present invention is directed to a detachable connector having two similar or two identical J-shaped or hook-shaped elements which are configured to be coupled to each other with a coupling element therebetween.

At least one of the J-shaped elements includes a shorter leg and an opposed, parallel, longer leg wherein the shorter leg and the longer leg are joined together by a bow extending one-hundred eighty degrees (180°).

The bow has a crown with a top cross-section which is parallel to both the shorter leg and the longer leg. From the top cross-section, the bow transitions to a pair of mid cross-sections forty-five degrees (45°) from the top cross-section.

The bow thereafter transitions from each of the mid cross-sections to a pair of joiner cross-sections which are ninety degrees (90°) from the top cross-section.

In one embodiment of the invention, the crown at the top cross-section has a substantially flat top exterior and an opposed radiused interior in order to interface and mate with a chain link and/or an anchor.

The bow at each of the mid cross-sections is substantially in the shape of an isosceles trapezoid with a flattened base at the interior and a rounded apex at the exterior.

The bow at each of the joiner cross-sections is substantially in the shape of an isosceles trapezoid with a flattened long base at the interior and a rounded base at the exterior.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
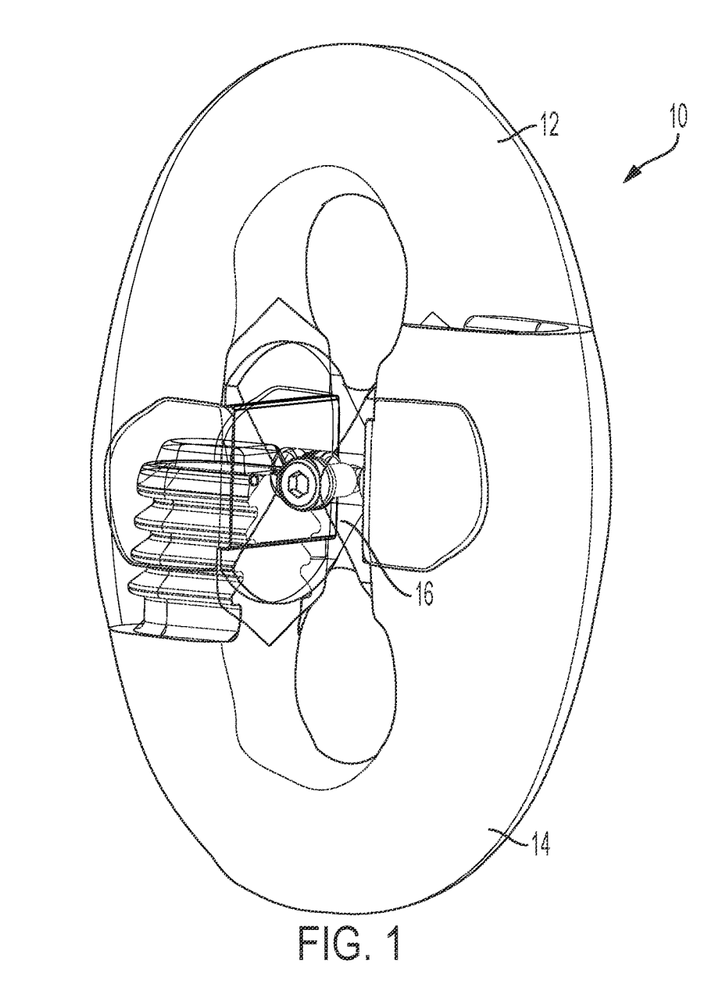
FIG. 1 illustrates a perspective view and FIG. 2 illustrates a front view of a first preferred embodiment of a high fatigue life detachable connector constructed in accordance with the present invention.
Figure 2:
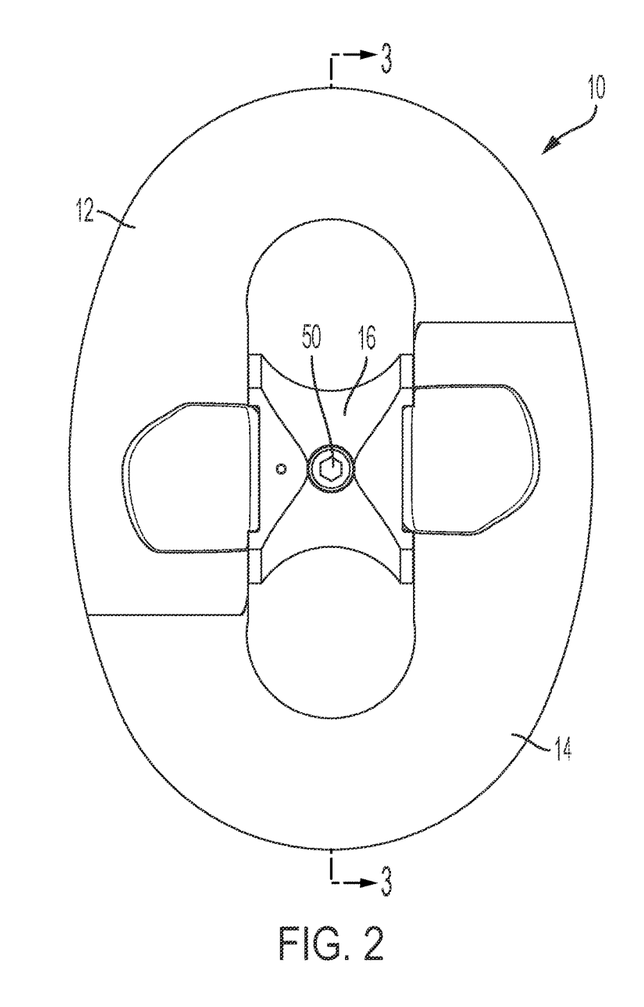
Figure 3:
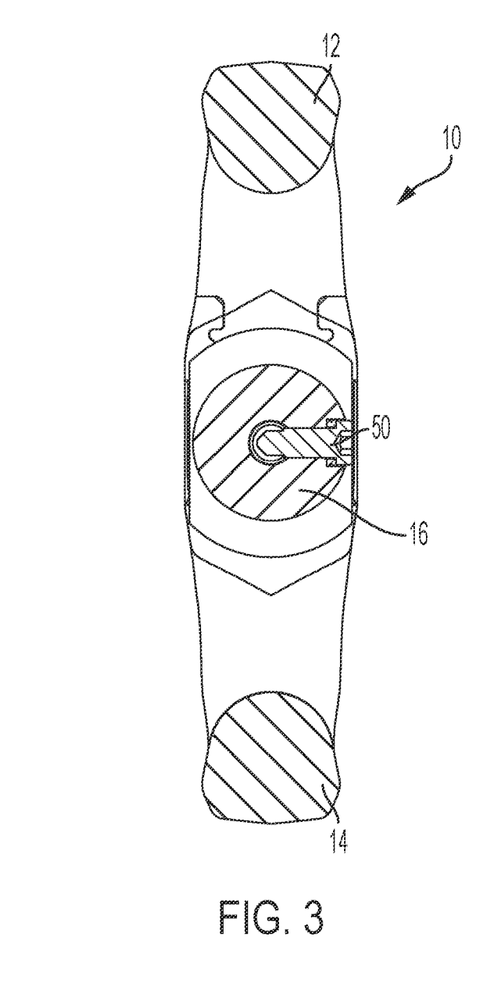
FIG. 3 illustrates a sectional view of the detachable connector shown in FIG. 1 taken along section line 3-3 of FIG. 2.

Referring to the drawings in detail, the figures illustrate two preferred embodiments of the invention. FIG. 1 illustrates a perspective view and FIG. 2 illustrates a front view of a first preferred embodiment of a high fatigue life detachable connector 10 constructed in accordance with the present invention. FIG. 3 illustrates a sectional view of the detachable connector 10 taken along section line 3-3 of FIG. 2. The detachable connector 10 includes two substantially mirror or identical U-shaped, hook-shaped, or J-shaped elements 12 and 14 which are configured to be coupled to each other with a coupling element 16 therebetween. As seen in FIGS. 1, 2, and 3, the J-shaped elements 12 and 14 and the coupling element 16 are assembled together in use but may be disassembled in order to detach or connect a chain or other fitting.

Detachable connectors are shown in Applicant's co-pending patent applications seen in U.S. Pat. Publ. Nos. 2019/0120326 and 2019/0162270, each of which is incorporated herein in its entirety.

Figure 4:
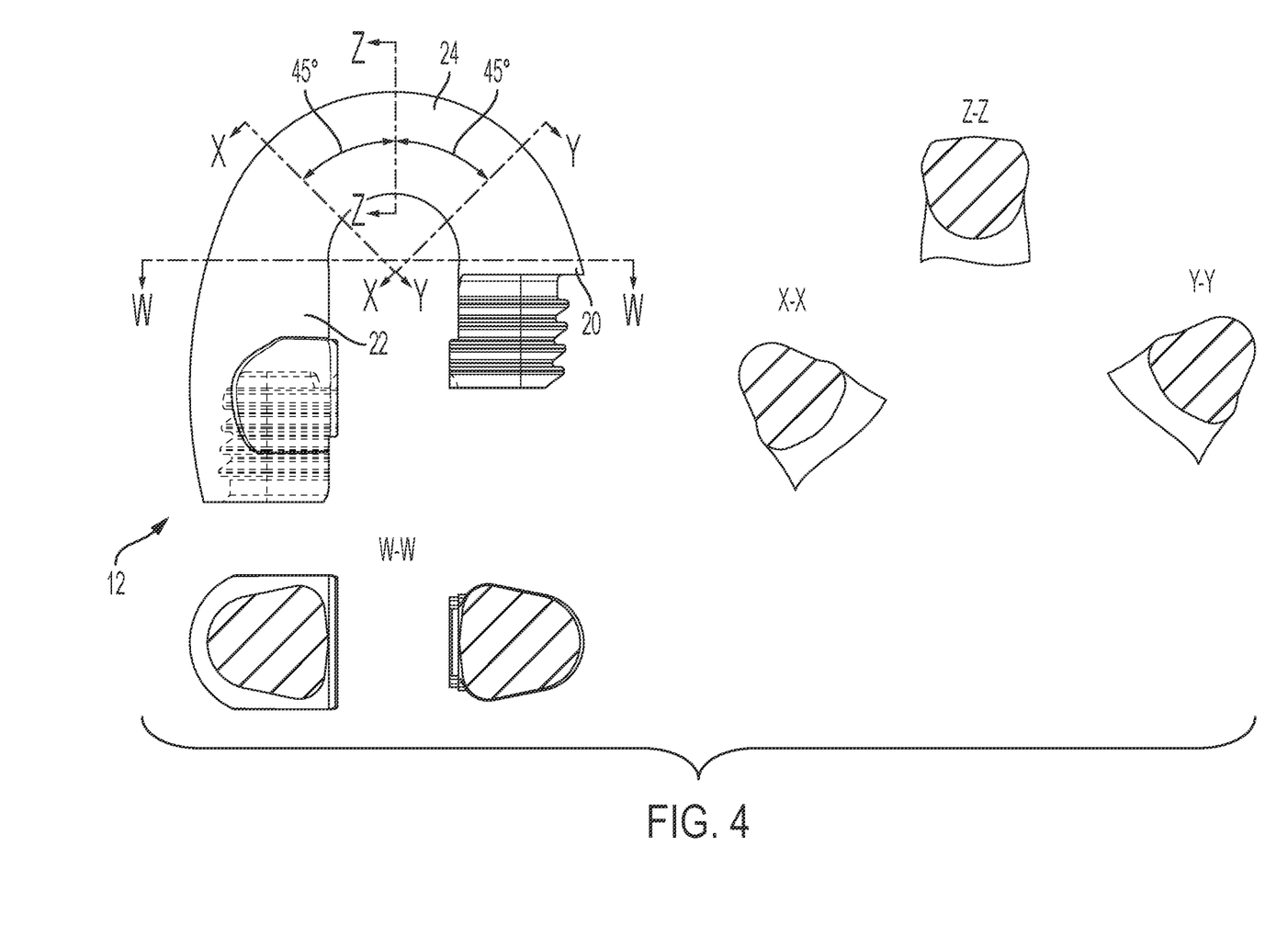
FIG. 4 illustrates a front view of one of a pair of J-shaped elements of the detachable connector apart from the assembled connector along with multiple sectional views thereof.

FIG. 4 illustrates one of the J-shaped elements 12 apart from the assembled connector 10. Each of the J-shaped elements includes a shorter leg 20 and an opposed, parallel longer leg 22. The shorter leg 20 and the longer leg 22 are joined together by a bow 24 extending one-hundred eighty degrees (180°).

Each bow 24 has a crown with a top cross-section, seen in FIG. 4 as section Z-Z, which is parallel to both the shorter leg 20 and to the longer leg 22. From the top cross-section, the bow 24 transitions in each direction to a pair of mid cross-sections which are 45 degrees (45°) from the top cross-section. The mid cross-sections are shown in FIG. 4 as sections X-X and Y-Y.

The bow 24 thereafter transitions from each of the mid cross-sections (X-X and Y-Y) to a pair of joiner cross-sections which are ninety degrees (90°) from the top cross-section (Z-Z). The joiner cross-sections are shown as sections W-W. The crown connects to the legs 20 and 22 at the joiner cross-section.

The top cross-section Z-Z has a substantially flat top exterior and an opposed radiused interior. In use, the radiused interior section will interface and mate with a chain link (not shown).

As best seen in the mid cross-sections X-X and Y-Y, the bow 24 at each of the mid cross-sections is substantially in the shape of an isosceles triangle with a flattened base at the interior and a rounded apex at the exterior.

As best seen in the joiner cross-sections W-W, the bow 24 at each of the joiner cross-sections is substantially in the shape of an isosceles trapezoid with a flattened long base at the interior and a rounded base at the exterior.

The other J-shaped element 14 (not seen in FIG. 4) will be a substantial mirror image.

Figure 5A:
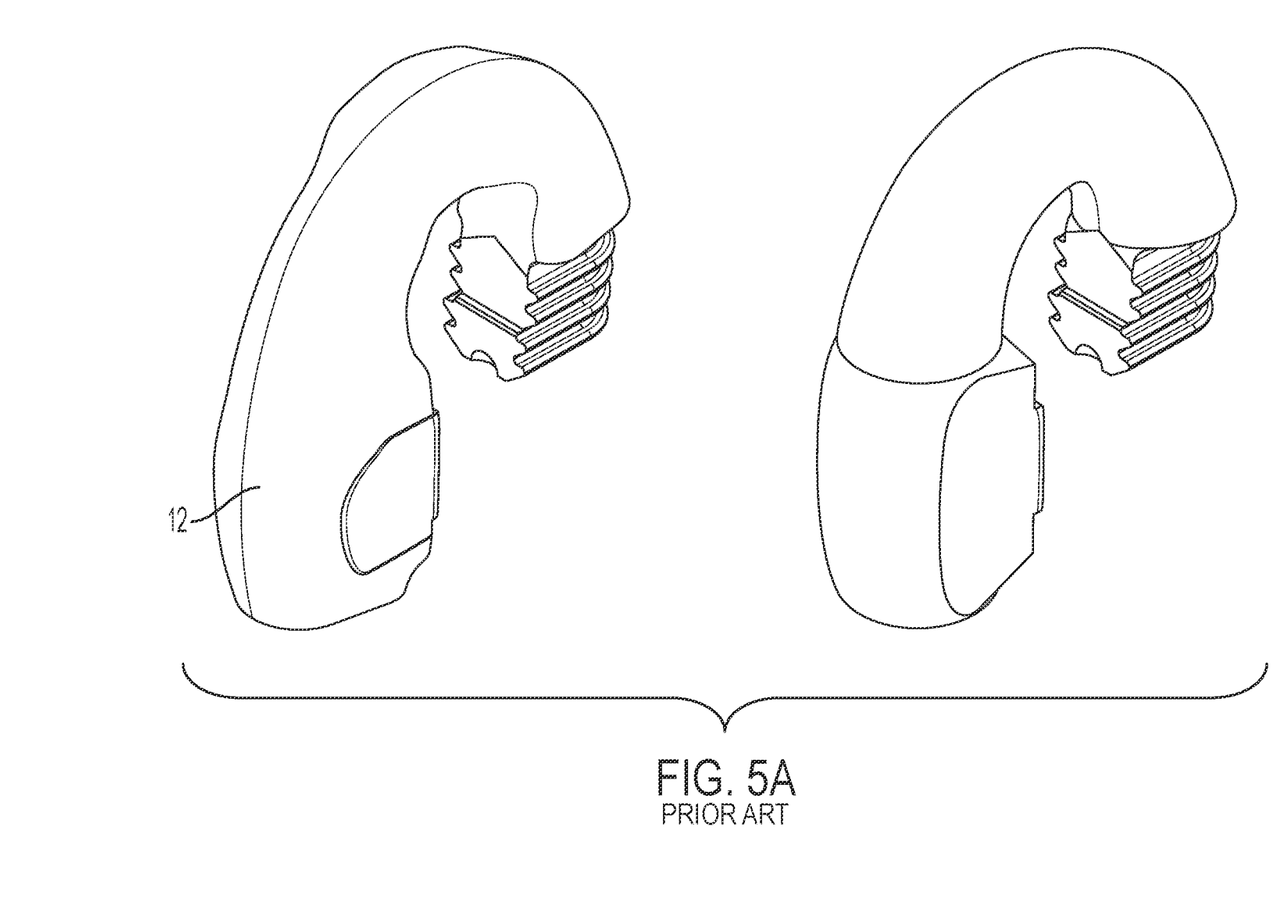
FIG. 5 shows a perspective view of one of the J-shaped elements compared to a standard, prior art connector device and a front view of a prior art connector along with sectional views thereof.
Figure 5B:
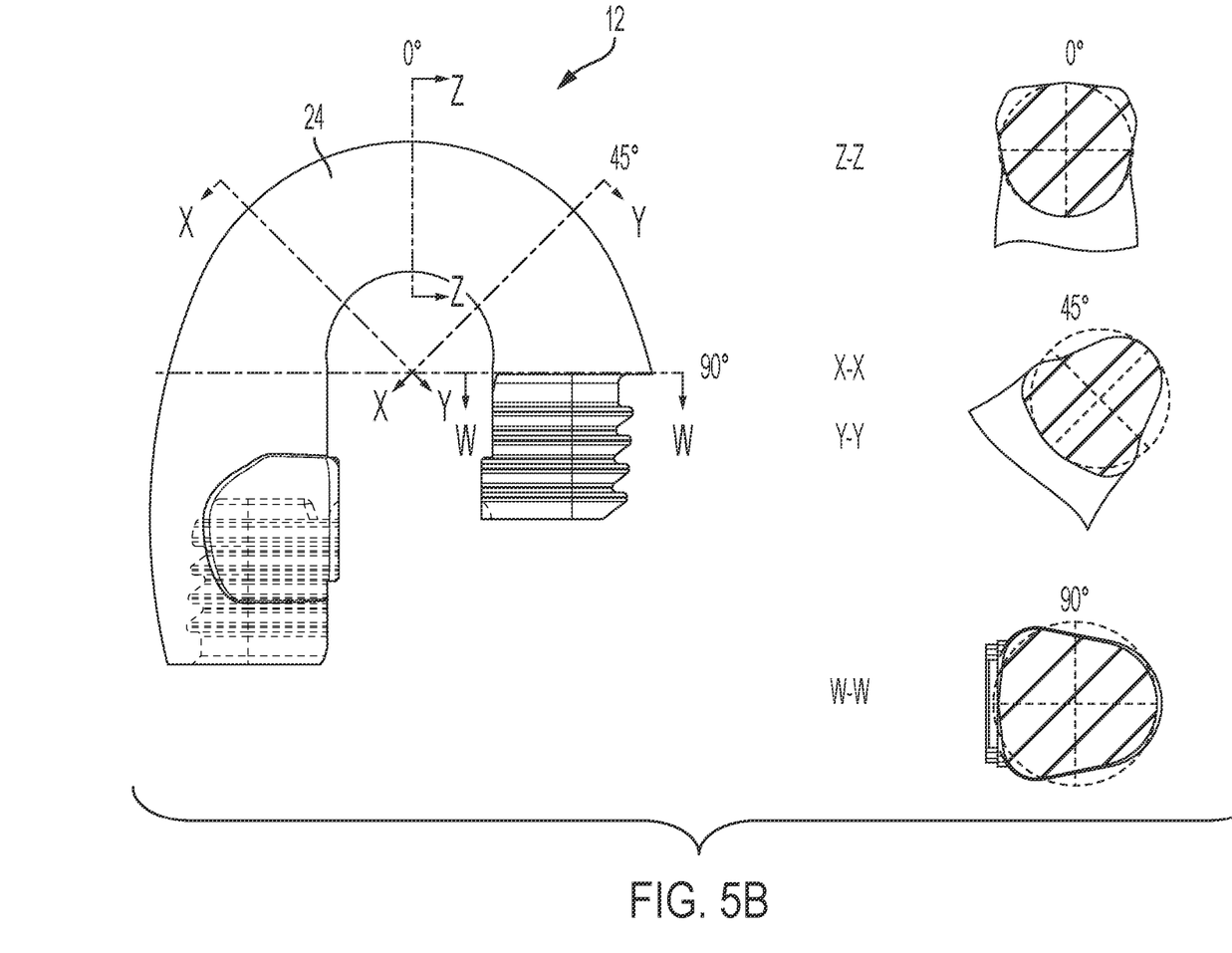

FIG. 5B shows one of the J-shaped elements 12 compared to a standard, prior art connector device in FIG. 5A.

The bow of the prior art connector is cylindrical with each of the cross-sections being circular. The overall height and width of the connector in the present invention in the front view in FIG. 2 is identical to the connector of the prior art, which allows unconstrained and unconditional use of the connector 10 with current equipment and permits the detachable connector to be received in other connectors.

In the cross-section views seen in FIG. 5 (Z-Z, X-X, Y-Y, and W-W), the respective cross-sections of the prior art connector are shown in dashed lines while the cross-sections of the present invention are superimposed.

The top cross-section (Z-Z) of the detachable connector 10 has a cross-sectional area at least 1.14 times an equivalent circular cross-section of the prior art.

From the top cross-section, the bow 24 transitions to a pair of mid cross-sections. Each of the pair of opposed mid cross-sections X-X and Y-Y of the detachable connector has a cross-sectional area no greater than 0.92 times an equivalent circular cross-section of the prior art connector.

Finally, the bow 24 transitions from each of the mid cross-sections to a joiner cross-section. Each of the pair of joiner cross-sections W-W has a cross-sectional area no greater than 0.87 times an equivalent circular cross-section of the prior art. It will be seen that the transition and tapering of the bow 24 optimizes the material utilization. In addition, the geometric transitions and tapering achieve greater structural integrity and higher load capacity.

Figure 6:
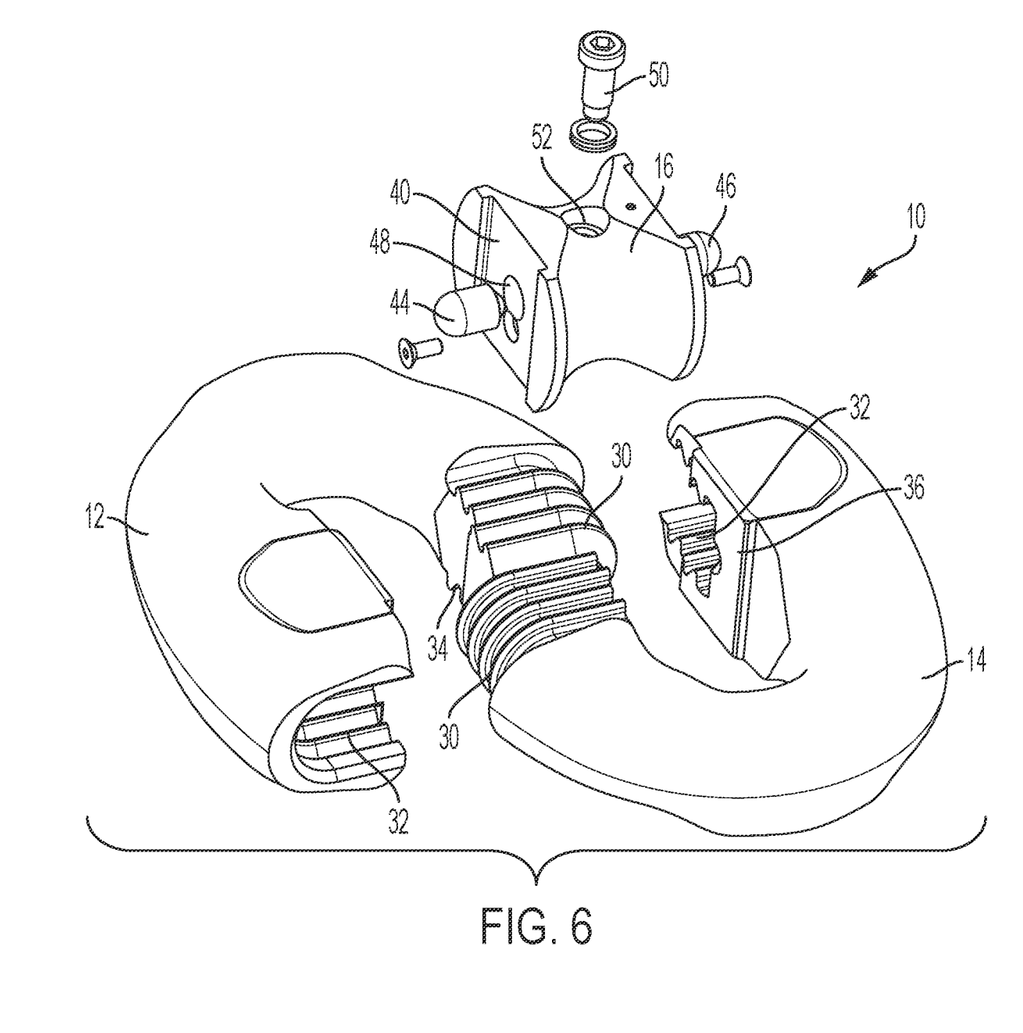
FIG. 6 is an exploded view of the detachable connector shown in FIG. 1.

FIG. 6 illustrates an exploded view of the detachable connector 10 shown in FIGS. 1, 2 and 3. Each shorter leg 20 of the J-shaped elements 12 and 14 includes external toothing 30. Each longer leg 22 of the J-shaped elements 12 and 14 includes internal toothing 32. In order to assemble the connector 10, the external toothing 30 of the shorter leg 20 of one element will mate with the internal toothing 32 of the longer leg 22 of the other element when the two elements are assembled.

Figure 7:
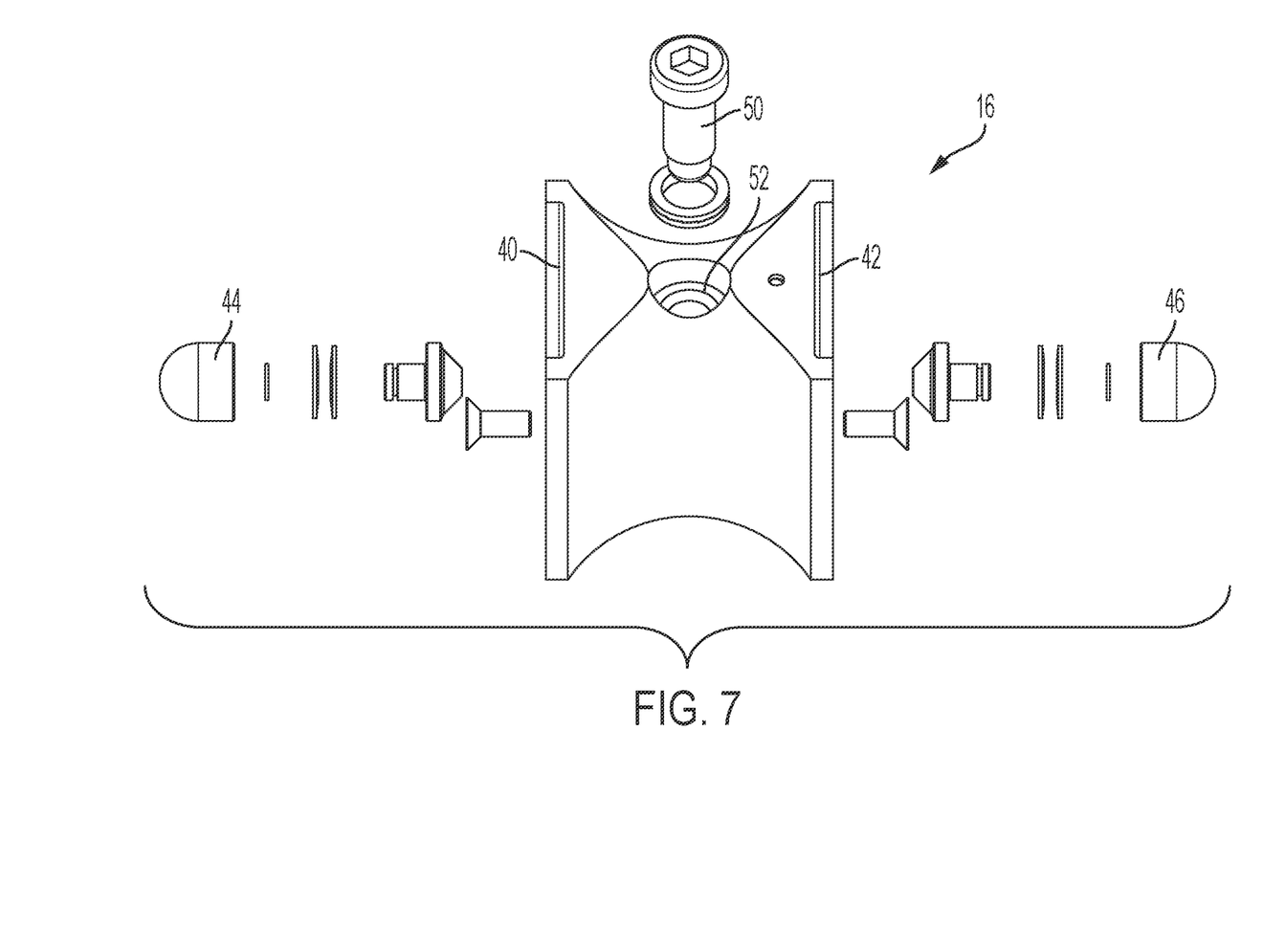
FIG. 7 is an exploded view of a coupling element of the detachable connector.

FIG. 7 illustrates the coupling element 16 apart from the detachable connector 10. Referring to FIG. 6 and with continuing reference to FIG. 7, an inner side of each shorter leg includes a protrusion 34 which mates with a cavity or recess 40 on the coupling element 16. An inner side of each longer leg 22 includes a protrusion 36 which mates with an opposed cavity or recess 42 on the coupling element 16.

The coupling element 16 includes two bolts 44 and 46, each having hemispheric ends received in a transverse bore 48 (partially visible in FIG. 6 but not visible in FIG. 7) which can be urged or pushed outwards via a central spreader element 50 in a threaded bore 52 perpendicular to the transverse bore 48.

FIGS. 8 through 12 illustrate a second preferred embodiment of a high fatigue life detachable connector 60 in order to connect a chain and an anchor (not shown).

Figure 8:
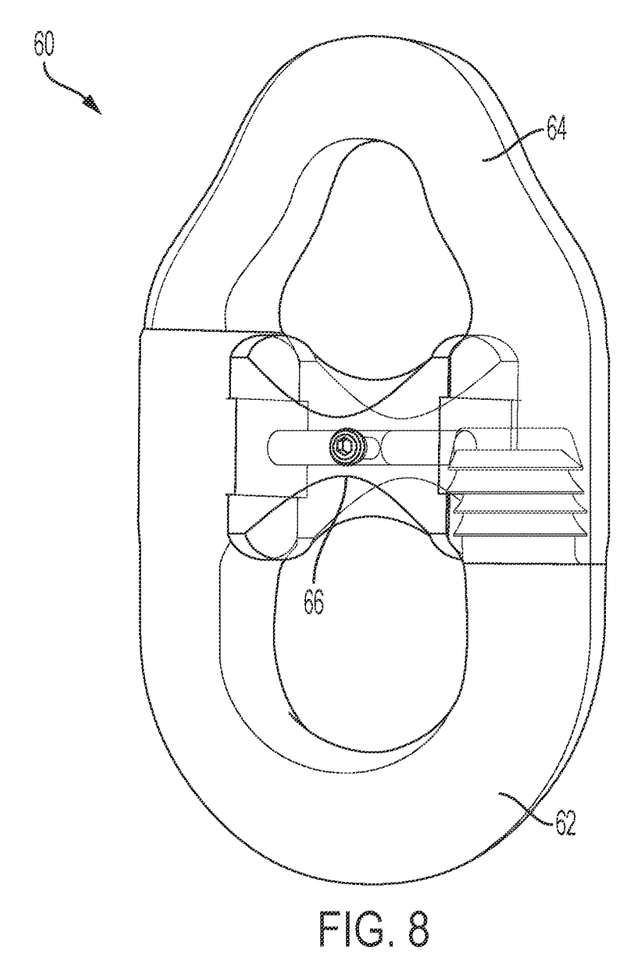
FIG. 8 illustrates a perspective view and FIG. 9 illustrates a front view of a second preferred embodiment of a high fatigue life detachable connector constructed in accordance with the present invention.
Figure 9:
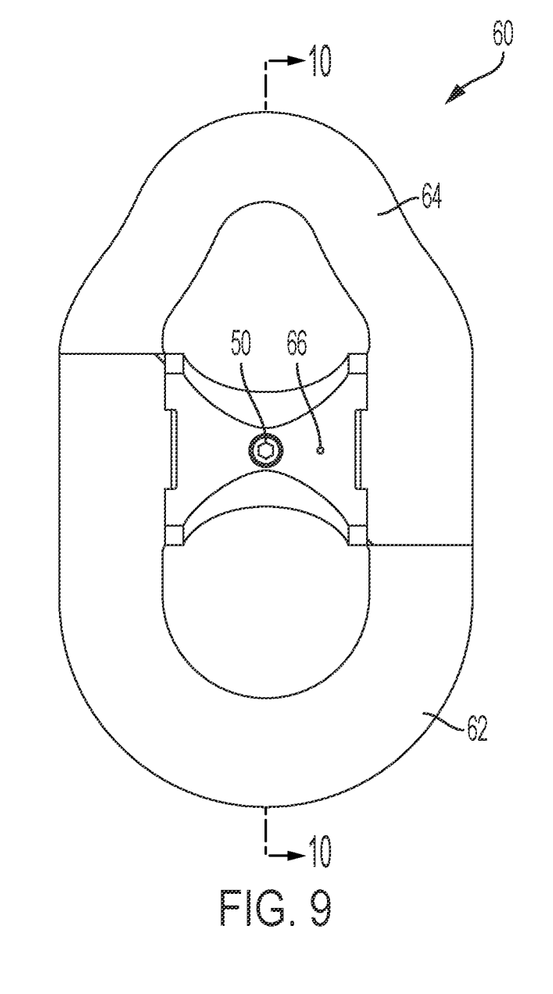
Figure 10:
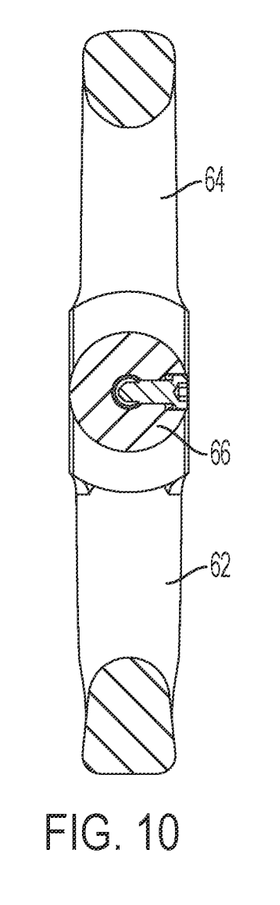
FIG. 10 illustrates a sectional view of the detachable connector shown in FIG. 8 taken along section line 10-10 of FIG. 9.

FIG. 8 illustrates a perspective view and FIG. 9 illustrates a front view of the second embodiment of the detachable connector 60. FIG. 10 illustrates a sectional view taken along section line 10-10 of FIG. 9.

The detachable connector 60 includes two somewhat similar yet distinct hook, U-shaped, or J-shaped elements 62 and 64 which are configured to be coupled to each other with a coupling element 66 therebetween, which is the same as the coupling element 16 described in detail in the first preferred embodiment.

As seen in FIGS. 8, 9 and 10, the J-shaped elements 62 and 64 and the coupling element 66 are assembled together in use but may be disassembled in order to detach or connect a chain and an anchor or other fitting.

Figure 11:
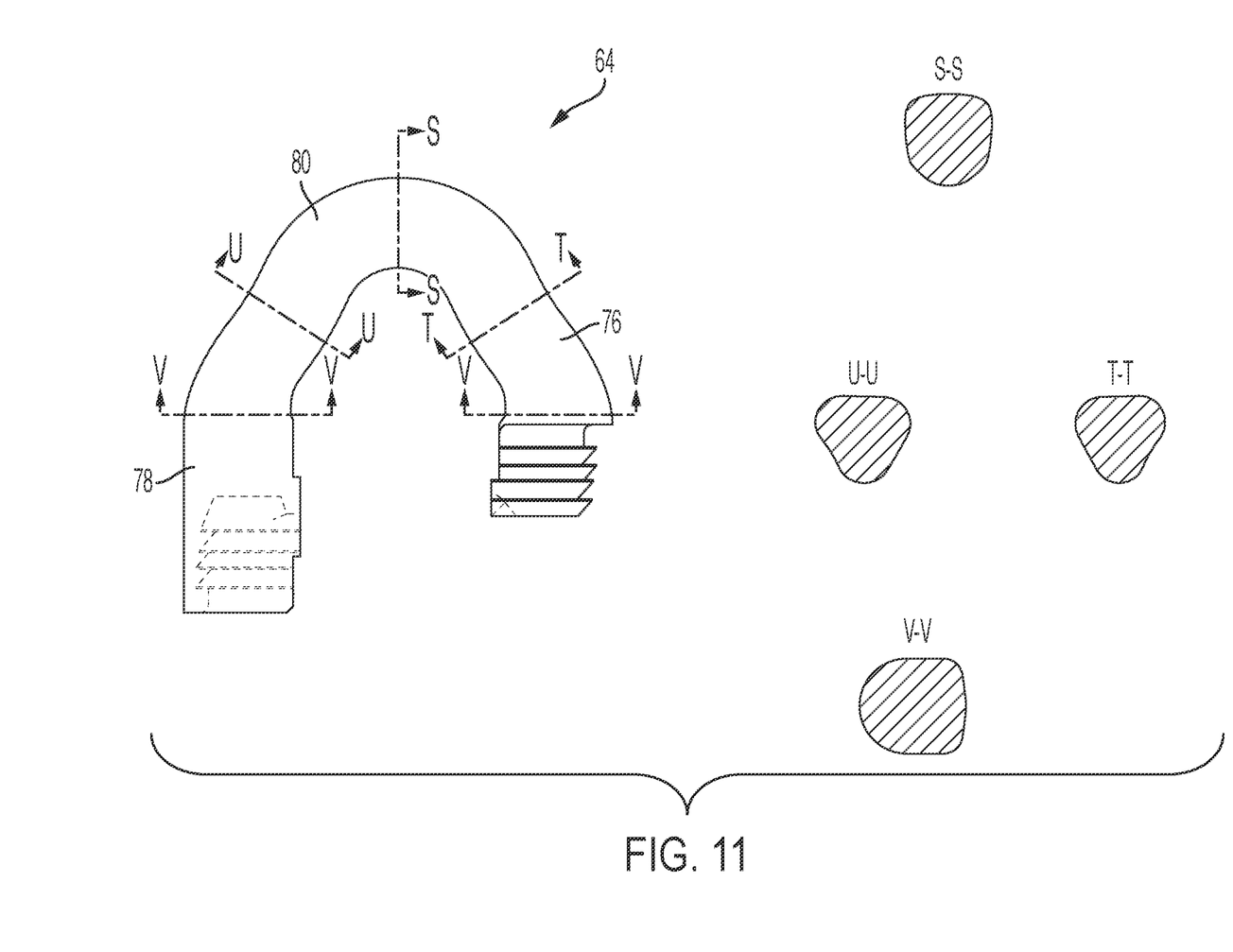
FIGS. 11 and 12 illustrate a front view of each of the J-shaped elements of the detachable connector apart from the assembled connector along with multiple sectional views thereof.
Figure 12:
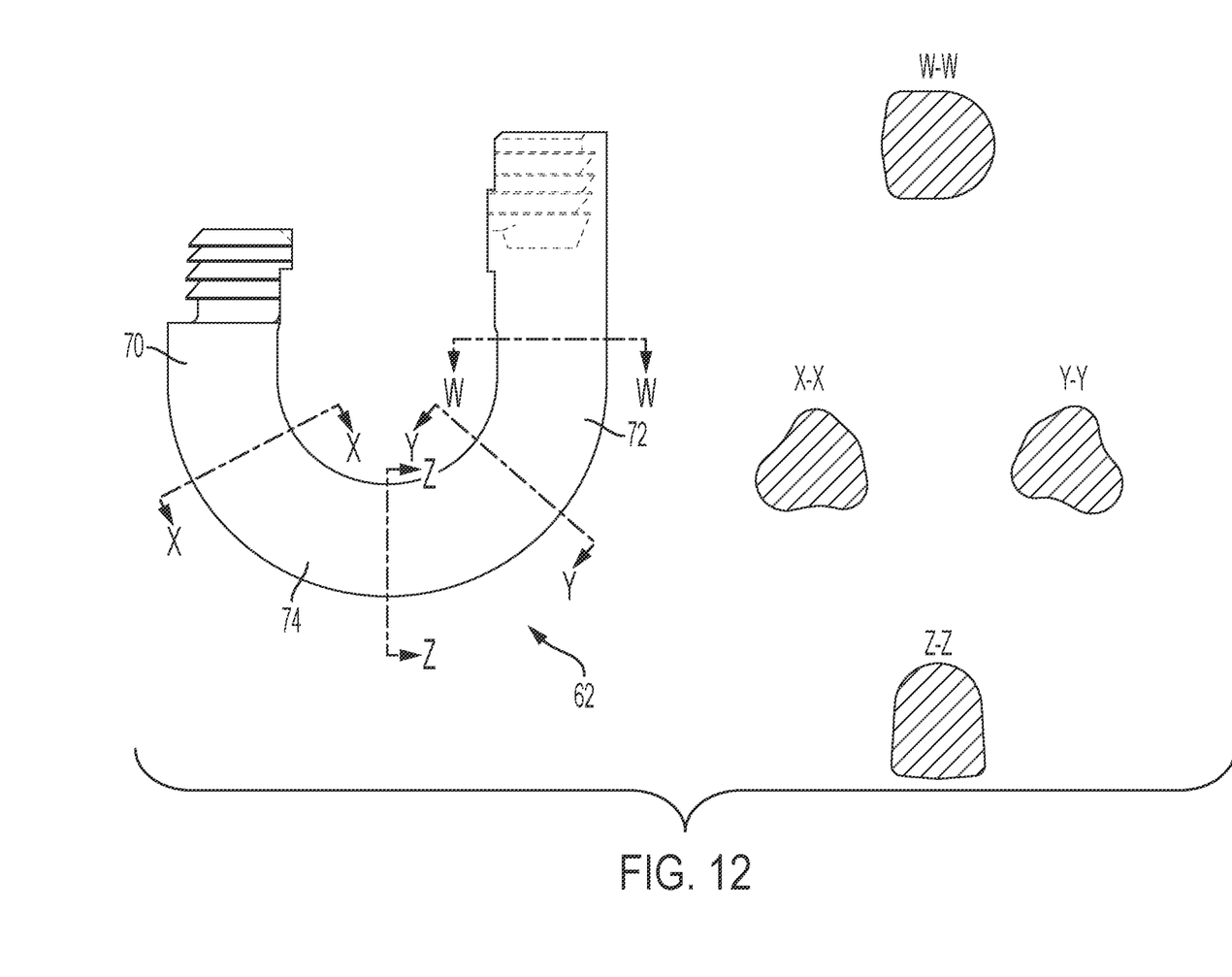

FIGS. 11 and 12 illustrate the front views of the J-shaped elements 62 and 64 apart from the assembled connector 60 along with multiple sectional views.

The J-shaped element 62 seen in FIG. 12 is configured to receive a chain link and is substantially the same as the J-shaped elements 12 and 14, described in detail with respect to the first preferred embodiment. The J-shaped element 62 includes a shorter leg 70 and an opposed, parallel longer leg 72. The shorter leg 70 and the longer leg 72 are joined together by a bow 74 extending one-hundred eighty degrees (180°).

The bow 74 has a crown with a top cross-section Z-Z which is parallel to the shorter leg and to the longer leg. From the top cross-section, the bow 74 transitions in each direction to a pair of mid cross-sections (X-X and Y-Y) which are forty-five degrees (45°) from the top cross-section as described in detail with respect to the first embodiment.

The bow 74 thereafter transitions from each of the mid cross-sections (X-X and Y-Y) to a pair of joiner cross-sections (W-W), which are each ninety degrees (90°) from the top cross-section (Z-Z).

The J-shaped element 64 seen in FIG. 11 is configured to receive an anchor and is somewhat distinct from the element 62. The J-shaped element 64 includes a shorter leg 76 and an opposed, parallel longer leg 78. The shorter leg 76 and the longer leg 78 are joined together by a bow 80 extending one-hundred eighty degrees (180°).

The bow 80 has a crown with a top cross-section S-S which is parallel to the shorter leg 76 and to the longer leg 78. From the top cross-section, the bow 74 transitions in each direction to a pair of mid cross-sections (T-T and U-U) which are forty-five degrees (45°) from the top cross-section, as described in detail with respect to the first embodiment.

The bow 80 thereafter transitions from each of the mid cross-sections (T-T and U-U) to a pair of joiner cross-sections (V-V, which are each ninety degrees (90°) from the top cross-section (S-S), as described in detail with respect to the first embodiment.

As previously described, the transition and tapering of the bows 74 and 80 optimizes the material utilization and fosters the structural integrity.

Whereas, the invention has been described in relation to the drawings attached hereto, it should be understood that other and further modifications, apart from those shown or suggested herein, may be made within the scope of this invention.

What is claimed is:

1. An improved fatigue life detachable connector, which comprises:

two J-shaped elements configured to be coupled to each other with a coupling element therebetween;

each of said J-shaped elements having a shorter leg and an opposed longer leg, with said shorter and longer legs joined together by a bow extending one-hundred eighty degrees (180°); and each said bow having a top cross-section, which transitions to a pair of opposed mid cross-sections forty-five degrees (45°) from said top cross-section, and which transitions to a pair of opposed joiner cross-sections ninety degrees (90°) from said top cross-section, wherein said top cross-section has a substantially flat top exterior and an opposed radiused interior;

wherein each said pair of opposed mid cross-sections of said bow is substantially in the shape of either:

an isosceles triangle with a flattened base at the interior and a rounded apex at the exterior, or an isosceles trapezoid with a flattened long base at the interior and a rounded base at the exterior.

2. The improved fatigue life detachable connector as set forth in claim 1 wherein each said shorter leg includes external toothing.

3. The improved fatigue life detachable connector as set forth in claim 1 wherein said two J-shaped elements are substantially identical to each other.

4. The improved fatigue life detachable connector as set forth in claim 1 wherein each said longer leg includes internal toothing.

5. The improved fatigue life detachable connector as set forth in claim 1 wherein an inner side of each shorter leg includes a protrusion which mates with a recess on said coupling element.

6. The improved fatigue life detachable connector as set forth in claim 1 wherein an inner side of each longer leg includes a protrusion which mates with a recess on said coupling element.

7. The improved fatigue life detachable connector as set forth in claim 1 wherein said coupling element includes a transverse borehole which receives two locking pins and a threaded borehole perpendicular to said transverse borehole which receives a spreader element.

* * * * *